(12) United States Patent
Reichel et al.

(10) Patent No.: US 7,203,406 B2
(45) Date of Patent: Apr. 10, 2007

(54) OPTICAL LOWPASS FILTER AND METHOD FOR PRODUCING AN OPTICAL LOWPASS FILTER

(75) Inventors: Steffen Reichel, Mehlingen (DE);
Frank-Thomas Lentes, Bingen (DE);
Michael Weisser, Southbridge, MA (US)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/165,427

(22) Filed: Jun. 23, 2005

(65) Prior Publication Data

US 2006/0008220 A1    Jan. 12, 2006

(30) Foreign Application Priority Data

Jun. 24, 2004    (DE)    ................ 10 2004 030 661

(51) Int. Cl.
*G02B 6/04*    (2006.01)
(52) U.S. Cl. ................ 385/115; 385/116; 385/120; 385/119
(58) Field of Classification Search ................ 385/115, 385/116, 117, 118, 119, 120, 901
See application file for complete search history.

(56) References Cited

U.S. PATENT DOCUMENTS

| | | | |
|---|---|---|---|
| 3,436,142 A * | 4/1969 | Siegmund et al. | .......... 385/116 |
| 4,676,593 A * | 6/1987 | Adachi et al. | .............. 385/117 |
| 5,299,275 A | 3/1994 | Jackson et al. | ............. 385/116 |
| 5,426,296 A * | 6/1995 | Shikai et al. | ............ 250/227.2 |
| 6,222,970 B1 * | 4/2001 | Wach et al. | ................ 385/115 |
| 6,366,726 B1 * | 4/2002 | Wach et al. | ................ 385/115 |
| 6,487,351 B1 | 11/2002 | Cryan et al. | ................ 385/120 |
| 2004/0001679 A1 | 1/2004 | Sisodia et al. | ............. 385/120 |
| 2004/0076390 A1 * | 4/2004 | Dong Yang et al. | ........ 385/116 |
| 2004/0108806 A1 | 6/2004 | Cok et al. | ................... 313/504 |

FOREIGN PATENT DOCUMENTS

| | | |
|---|---|---|
| DE | 69616835 | 12/2001 |
| EP | 0246699 | 11/1987 |
| EP | 0747738 | 12/1996 |
| EP | 0896232 | 2/1999 |
| GB | 2364791 | 2/2002 |
| JP | 04113382 | 4/1992 |

* cited by examiner

*Primary Examiner*—Brian M. Healy
(74) *Attorney, Agent, or Firm*—Ohlandt, Greeley, Ruggiero & Perle, L.L.P.

(57) ABSTRACT

The invention relates to an optical lowpass filter that has a plurality of light guiding optical fibers, and to a method for producing such an optical lowpass filter.

33 Claims, 5 Drawing Sheets

OPTICAL LOWPASS FILTER AND METHOD FOR PRODUCING AN OPTICAL LOWPASS FILTER

CROSS-REFERENCE TO RELATED APPLICATIONS

This application claims the benefit under 35 U.S.C. §119 of German Application No. 20 2004 030661.3-51, filed Jun. 24, 2005, the entire contents of which are incorporated by reference herein.

BACKGROUND OF THE INVENTION

1. Field of the invention

The invention relates in general to devices for influencing optical signals and to methods for producing them, and specifically to an optical lowpass filter for imaging or image receiving systems and a method for producing this optical lowpass filter.

2. Description of Related Art

Optical lowpass filters are conventionally used, for example, for the sensors of digital cameras. A substantial task of an optical lowpass filter is to attenuate signal components that are above the Nyquist frequency. It is also advantageously the aim to use optical lowpass filters to reduce defective images such as moiré effects and aliasing.

Particularly in the case of integrated image sensors such as CCD and CMOS sensors, spatial frequency components that are above the limiting resolution of the sensor act in interfering fashion since these can lead to defective information at the location of the sensor. This results in image defects such as apparent resolution or contrast reversal (image noise, image artifacts).

Various types of optical lowpass filters are known in practice. For example, US 2004/0042079 (Osawa et al.) discloses birefringent optical lowpass filters. These can be configured as multilayer quartz plates.

Furthermore, JP 55074512 A (Michihiro) discloses an optical lowpass filter that is constructed from a multiplicity of optical elements whose refractive indices change from one side to the other.

The chief common feature of the known optical lowpass filters is that they can be expensive to produce and sensitive, above all, to mechanical loads. However, filters that consist of a number of layers are mostly relatively thick. Furthermore, filters made from birefringent quartz plates can lead to chromatic aberrations.

It is disadvantageous above all in the case of digital imaging systems that the sensitivity of the optical sensors can be strongly dependent on the incidence angle of the incoming light. This necessitates a telecentric alignment of the sensor.

Consequently, in order to even out these irregularities, but also to reduce defective images such as step formation, digital cameras mostly have an arithmetic unit in which the known image defects are removed by calculation mathematically. The result of this is that the resolution achieved frequently no longer corresponds to the resolution of the sensor. Moreover, removing errors by mathematical calculation by means of a microchip is expensive in terms of energy. Precisely in the case of high resolutions, there is a need for very high computing powers than can greatly shorten the service life of the digital camera. Again, the computing times are often so long that they result in annoying pauses between taking a picture and the renewed readiness of the apparatus for shooting.

BRIEF SUMMARY OF THE INVENTION

By contrast, the invention is based on the object of providing an optical lowpass filter that is as easy as possible to produce and has good optical properties.

According to the invention, optical lowpass filters can be designed to be as thin as possible.

It is also an object of the invention to provide an optical lowpass filter and a combination of optical filter and image sensor in the case of which the lowpass filter is tuned to the optical properties of the image sensor, the aim, in particular, being for the lowpass filter to correct optical defects or irregularities of a digital image sensor.

The invention is also intended to enable the dependence of the sensitivity of an optical sensor on the incidence angle to be reduced. Image defects such as moiré effect and aliasing are intended to be reduced by the invention.

The object of the invention is already achieved by means of an optical lowpass filter and by means of a method for producing an optical lowpass filter.

A further subject matter of the invention is an image sensor, an imaging element, particularly a digital projector, a digital camera, video cameras and a mobile telephone camera.

Preferred embodiments and developments of the invention are to be gathered from the respective subclaims.

In accordance with the invention, an optical lowpass filter is provided that has a multiplicity of light guiding optical fibers.

The optical fibers are advantageously arranged substantially parallel to one another.

Parallel within the meaning of the arrangement is understood to be any substantially approximately parallel fiber bundle in the case of which the fibers are aligned such that the light can enter the fibers on one side, the acceptance surface, and emerges on the other side, the exit surface.

Such an arrangement is denoted as a "face plate". The fibers guide light at least in a subspectrum of the visible region.

The inventors have found in a most surprising way that such a fiber bundle is well suited as an optical lowpass filter, and that defective images such as image noise can be substantially reduced.

Moreover, when it is used in combination with an imaging digital optical sensor, for example a CCD sensor, the lowpass filter according to the invention can substantially reduce the dependence of the sensitivity on the incidence angle.

The optical filter according to the invention is easier and less expensive to produce than conventionally used filters, in particular than filters made from birefringent material. The lowpass filters according to the invention are in this case more effective and can also be implemented in thicknesses substantially below one mm.

In accordance with a preferred embodiment of the invention, the optical fibers are embedded in a covering material. The covering material fixes the optical fibers, or can act as a mantle for the core of the optical fiber. Moreover, the optical properties can be additionally influenced by the covering material.

As an alternative to the covering material, however, it is also possible to conceive clamping the fiber bundle together, for example in a ring, or bonding the fibers together.

In a development of the invention, the fibers have a round, elliptical, rectangular, in particular square or hexagonal cross-sectional surface. Particularly as glass fibers, round fibers are the most common light guides, and are particularly cost-effective. The hexagonal shape has the advantage that the light guides can be particularly tightly packed in a honeycomb structure. Rectangular, in particular square filters are particularly suitable as filters for an image sensors whose pixels are of square shape, for example.

In a preferred embodiment of the invention, the fiber cross sections are arranged relative to one another in honeycomb fashion. Packing that is as dense as possible is advantageous, that is to say the cross sections of the fibers must exhibit a maximum surface area in relation to the covering material. The transmission of the optical lowpass filter is mostly highest in this way.

The fibers and the covering material advantageously have a different refractive index. This ensures that crosstalk between fibers and covering material is suppressed.

In a preferred embodiment, the fibers are glass fibers. Glass fibers have low absorption rates. Alternatively, plastic fibers are also conceivable, in particular when the filter is intended to be particularly light, or must withstand bending loads.

In a further preferred embodiment, use is also made of glass as covering material. Particularly when glass fibers are used, the covering material thus makes a particularly effective contact with the fibers.

In a further embodiment of the invention, the covering material and/or at least a portion of the optical fibers are/is dyed in a substantially dark, in particular black fashion. This reduces crosstalk between the fibers. Depending on application, however, a transparent covering material can also be advantageous, since darkly dyed covering material leads to a reduced transmission. The crosstalk can be matched by setting the transmission of the covering material, and the optical lowpass effect can thus be set.

A further advantageous possibility for reducing crosstalk between individual fibers is the additional provision of light absorbing fibers. Such fibers can be arranged both regularly and irregularly. The light absorbing fibers can be, for example, black fibers, or opaque fibers in the region of the light transmitted by the light guiding fibers.

In a development of the invention, the fiber ends are structured, particularly being of convex or concave shape. It is thus conceivable, for example, to focus the light directly onto individual pixels. Depending on application, it is provided to configure the fibers in a plano-convex, plano-concave, biconvex, biconcave, concave-convex or convex-concave fashion. In conjunction with an imaging optical sensor, it is thus possible to implement a microlens array structure that reduces the dependence of the sensitivity of a sensor on the incidence angle.

In a development of the invention, the optical fibers alternately have different refractive indices. In particular, it is provided to arrange high-index and low-index fibers alternately. Zero order diffraction patterns can thus be excluded between the individual fibers.

In a development of the invention, the optical fibers are arranged substantially without order relative to one another. A stochastic array of the fiber ends is produced by such disorder, that is to say there is no regular pattern present. The stochastic array has the effect of substantially reducing image defects, such as moiré, that are caused by symmetrical structures.

These properties are further amplified by the use of optical fibers of different diameter.

In a preferred embodiment, the filter has a thickness of below 2 mm, preferably of below 1 mm, with particular preference below 0.5 mm. Such slight thicknesses can be implemented with the aid of the optical lowpass filter according to the invention, and are particularly well suited to cameras, in particular mobile phone cameras.

In a development of the invention, the filter has an antiscratch coating on at least one side.

It is likewise conceivable to provide the filter with an antireflection coating on at least one side.

In a particular embodiment of the invention, the filter is substantially free from potassium-40. K-40 is frequently a constituent in glasses. Since K-40 is a β-emitter, it is possible to influence sensitive optical sensors such as CCD chips. A filter made from glass free from K-40 is therefore particularly well suited for optical sensors, above all.

Particularly for the use of the filter for optical sensors, it is likewise advantageous when the filter has a layer which absorbs infrared radiation or a material absorbing infrared. Owing to infrared radiation, the sensors can produce image defects or be overdriven. This can be avoided by means of an IR absorbing layer.

In a preferred embodiment, the filter has a numerical aperture of above 0.6, preferably above 0.8, with particular preference of above 0.9. A numerical aperture of approximately 1 is possible with the aid of the filter according to the invention.

In a development of the invention, the numerical aperture of the filter changes from the center to the edge, it being provided in particular that the numerical aperture increases from the center toward the edge. Thus, the filter can even out image defects that are caused by a further optical system; in particular it is possible to correct the luminosity, which in CCD chips frequently decreases from the center toward the edge.

Again, the transmission can change from the center toward the edge, for example increase, in order to achieve a uniform brightness distribution despite a decreasing luminosity of an imaging sensor in the edge region.

In a preferred embodiment of the invention, the diameter of the optical fibers is below 10 μm, preferably below 5 μm, with particular preference below 2.5 μm.

It is even conceivable for the fibers to be drawn to a diameter below 1 μm or even to a diameter that is in the region of the wavelength of visible light or even there below.

The covering material preferably has a maximum thickness of below 5 μm, preferably of below 2 μm, with particular preference of below 1 μm. Maximum thickness is understood as the maximum spacing of the fibers from one another. Since the transmission of the filter decreases, particularly in the case of darkly dyed covering material, a fraction of covering material that is as slight as possible is advantageous.

As regards a possible structuring of the filter, it is advantageous when optical fibers and covering material have different etching rates. For example, it is conceivable to structure the individual fiber ends by means of a covering material with a substantially higher etching rate.

In a development of the invention, an ultrasound transmitter, in particular a quartz oscillator or a piezoelectric transducer, is coupled to the lowpass filter. The optical filter can thus be set oscillating and cleaned in this way.

In a development of the invention, the acceptance or the exit surface of the filter is structured, in particular being of convex or concave design. Structuring within the meaning of the application is understood as any surface profile deviating from a plane. It is therefore possible to match the lowpass filter to other components such as, for example, a CCD chip. However, it is also possible to influence the optical properties in a targeted fashion, particularly owing to a convex or concave shape. For example, the lowpass filter according to the invention can at the same time have properties of an optical lens.

The invention further relates to an image sensor, in particular a CCD or CMOS sensor that has an optical lowpass filter according to the invention. By contrast with known optical lowpass filters, a combined component can be implemented particularly effectively with the lowpass filter according to the invention because of the slight thickness.

In order to suppress image defects, it is expedient to keep the diameter of the optical fibers smaller than the pixel size of the optical sensor.

In an alternative design, the optical fibers of the optical lowpass filter are arranged substantially in accordance with the pixels of the optical sensor. Each pixel is thus assigned a fiber. Expediently, the optical fibers are aligned in a fashion essentially congruent with the pixels. In particular, a layered structure of an optical sensor is provided in the case of which one layer is formed by a lowpass filter according to the invention. Such a layered structure is feasible with the aid of the filter according to the invention thanks to the slight thickness. Because of the small pixel sizes with imaging optical sensors, aligning the filter is complicated and cannot be carried out subsequently by hand. Consequently, it is advantageous to equip an image sensor from the beginning with a lowpass filter according to the invention. The diameter of the optical fibers advantageously corresponds in this case approximately to the pixel size.

In a development of the invention, the numerical aperture of the optical filter is appropriately matched to the optical characteristic of the sensor. It is, for example, conceivable to achieve edge brightening thereby.

A further object of the invention is an imaging element, in particular an LCOS, which comprises an optical lowpass filter according to the invention. Thus, the filter can also be used in the reverse direction, that is to say, for example, for projectors, in particular for digital projectors.

Also conceivable is use as a constituent of an optical lens, or as an attachment for a camera.

The optical filter according to the invention is particularly suitable for mobile digital cameras, in particular mirror reflex cameras and mobile phone cameras.

The invention further relates to a method for producing an optical lowpass filter in the case of which a plurality of optical fibers are provided, and the fibers are arranged substantially parallel to one another and embedded in a covering material.

In particular, it is further conceivable for the optical lowpass filter to be heat-treated, and thus to achieve better contact between the covering material and optical fibers.

In a particularly preferred embodiment of the method, the optical lowpass filter is cut out from a bundle composed of fibers and covering material. Thus, a bundle comprising optical fibers is produced in a simple and cost-effective way. The optical lowpass filters are cut out from the bundle. Cutting within the meaning of the application is understood as any type of separating method in which an approximately flat cut surface is produced.

The invention is to be explained in more detail below with the aid of exemplary embodiments. In this case, the exemplary embodiments serve only for the purpose of schematic explanation of the invention, the latter not being restricted to the combination of the features of the exemplary embodiments.

DETAILED DESCRIPTION OF THE INVENTION

Figure 1:
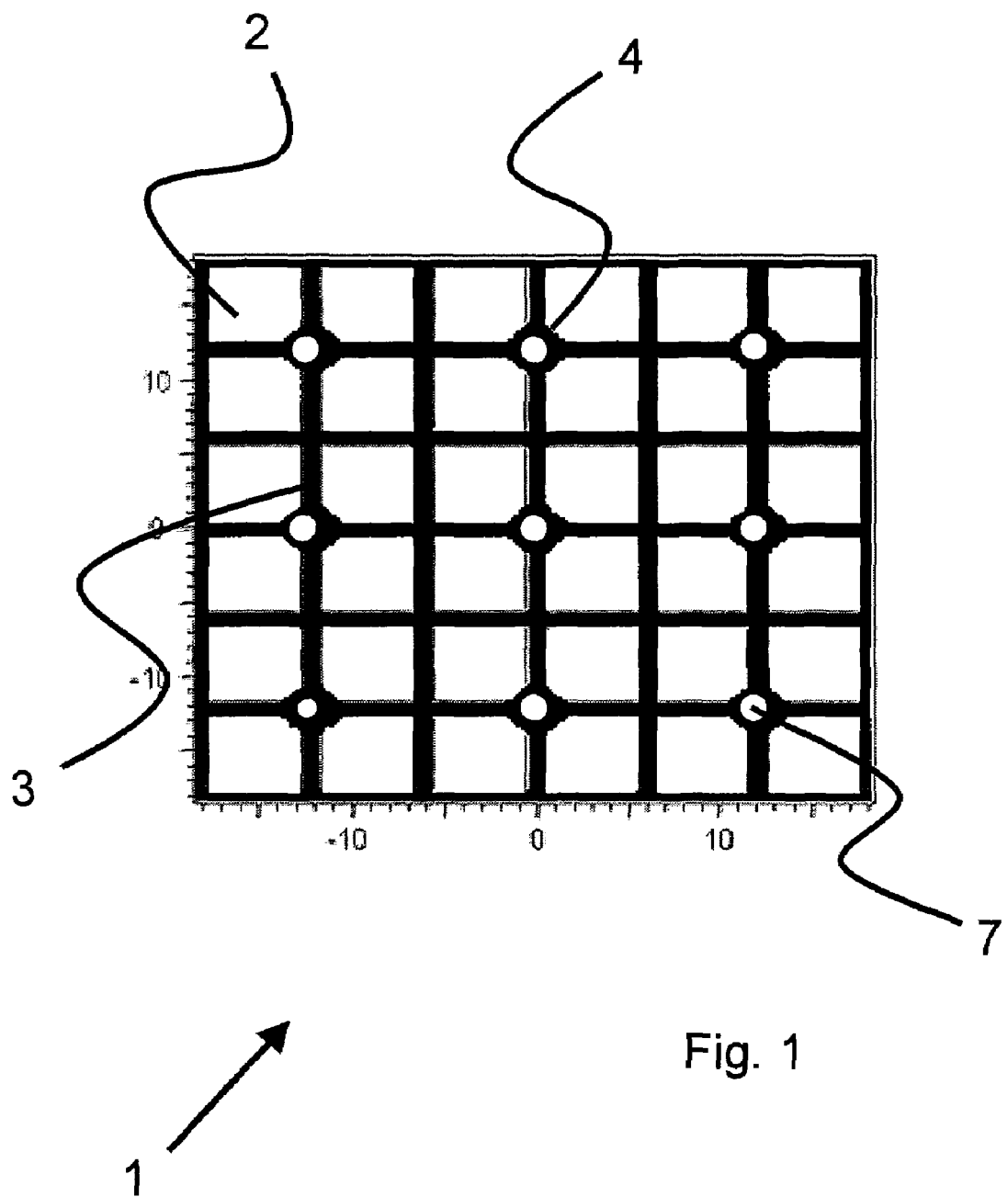
FIGS. 1 and 2 show schematics of optical lowpass filters according to the invention in plan view.

FIG. 1 illustrates an optical lowpass filter 1 according to the invention, in plan view. The optical fibers 2 have a substantially rectangular cross section, an edge 4 being recessed only at one corner. The exemplary embodiment illustrated in FIG. 1 of an optical lowpass filter 1 also has light absorbing fibers 7. These fibers are arranged in the recesses formed by the edges 4. In plan view, this structure results in a regular arrangement, or a regular pattern of the light absorbing fibers. However, it is also possible to provide a modified embodiment in the case of which the light absorbing fibers are arranged irregularly. For example, light guiding fibers can be replaced for this purpose in a stochastic way by light absorbing fibers. This is advantageous, for example, in order to avoid moiré effects. The light absorbing fibers 7 can be black fibers, for example.

The optical fibers are embedded in a covering material 3. The exemplary embodiment is particularly suitable as an optical lowpass filter for digital image sensors.

Figure 2:
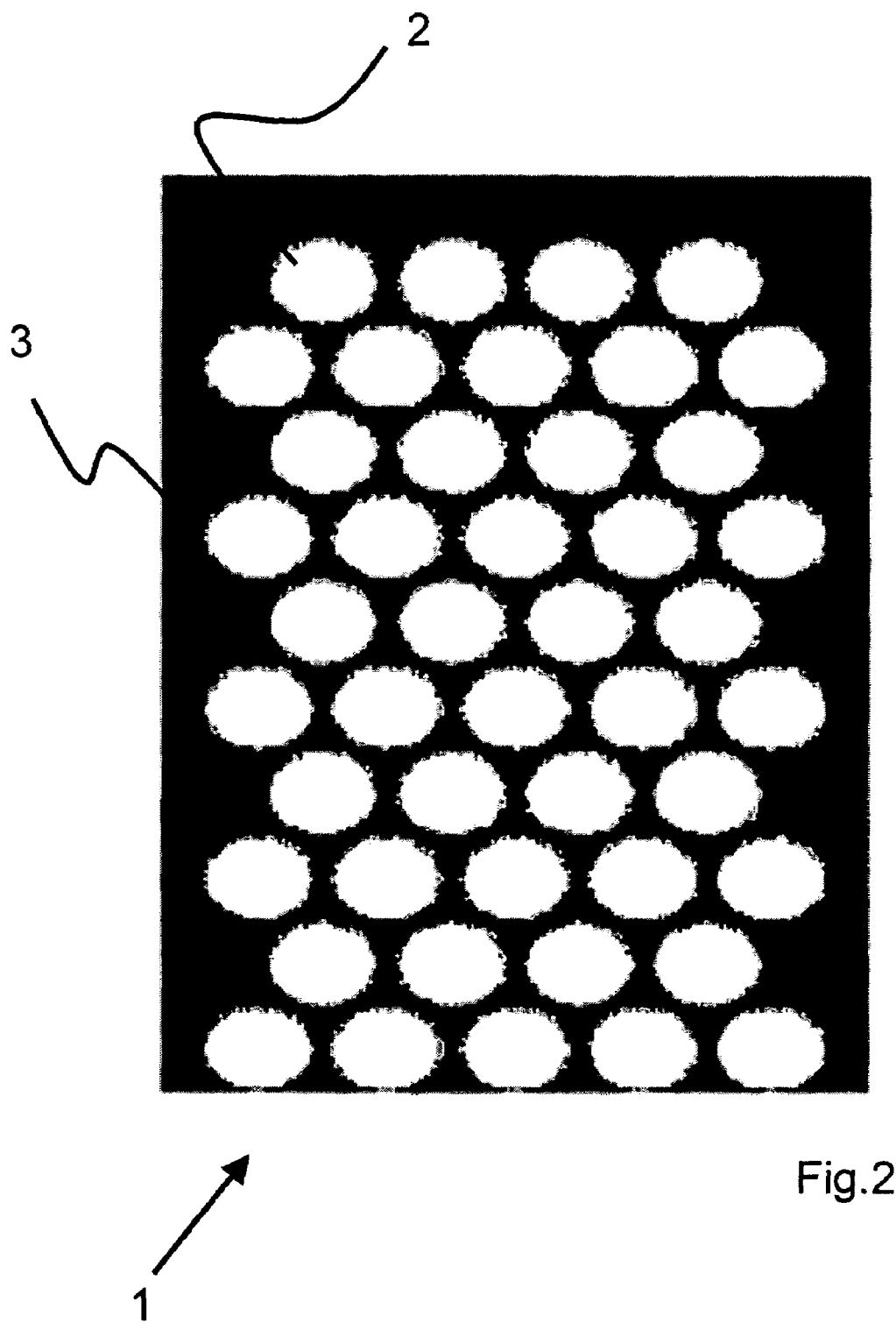

FIG. 2 shows a schematic of an alternative embodiment of a lowpass filter 1 according to the invention in the case of which the optical fibers 2 have a round cross section. Elliptical optical fibers 2 are, however, also possible. The individual fibers 2 are stacked on one another in honeycomb fashion such that a maximum packing density results. The optical fibers 2 are embedded in a covering material 3.

Figure 3:
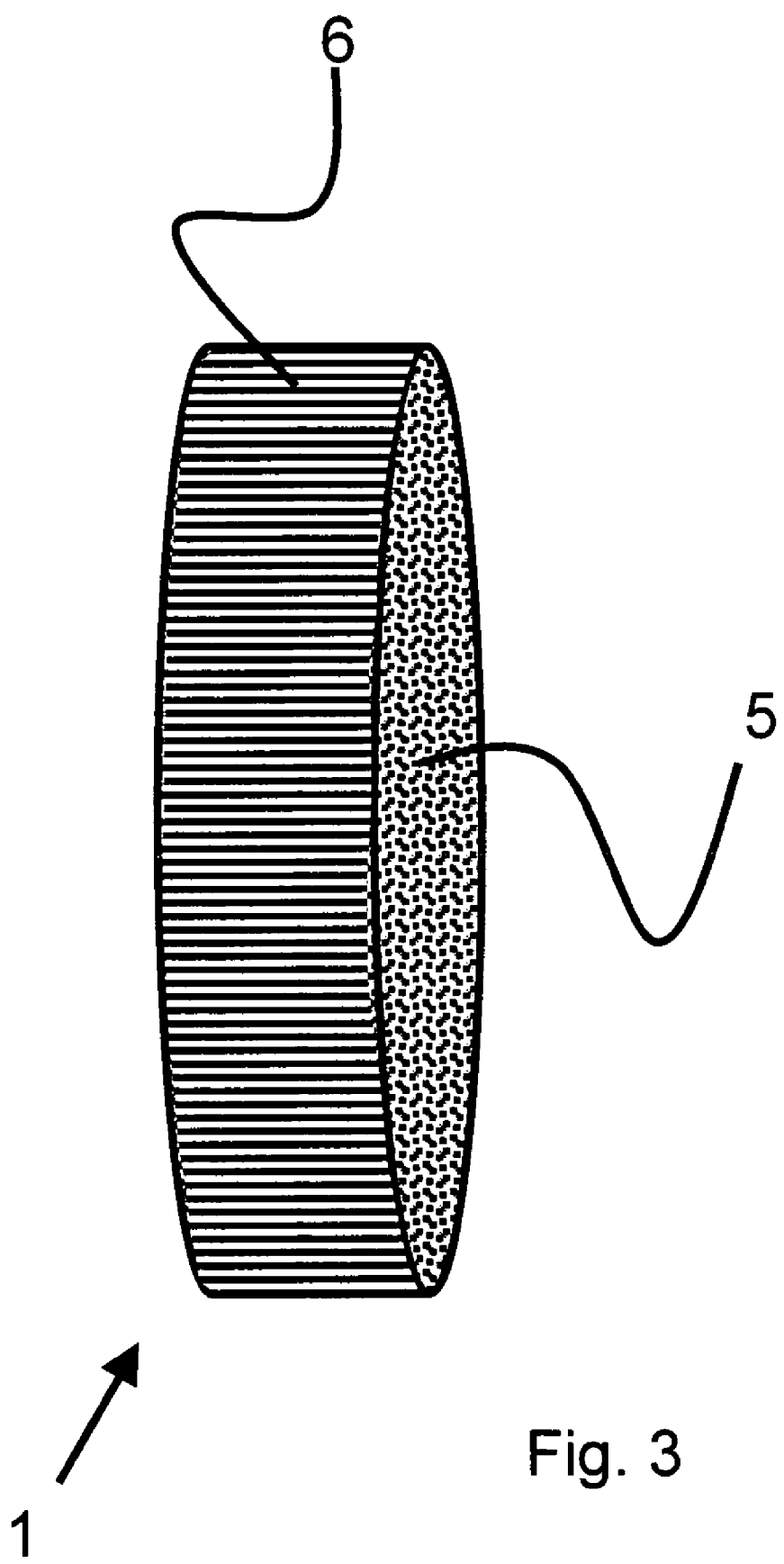
FIG. 3 shows a schematic perspective view of an optical lowpass filter according to the invention.

FIG. 3 shows a perspective schematic of an optical lowpass filter 1 according to the invention. The filter 1 is of substantially circularly cylindrical design and is suitable, in particular, for a camera. For this purpose, the filter can be provided with a holding ring (not visible) on the edge side 6. The light enters the optical filter via the acceptance surface 5, is guided to the other side through the optical fibers, and emerges via the exit surface (not visible).

Figure 4:
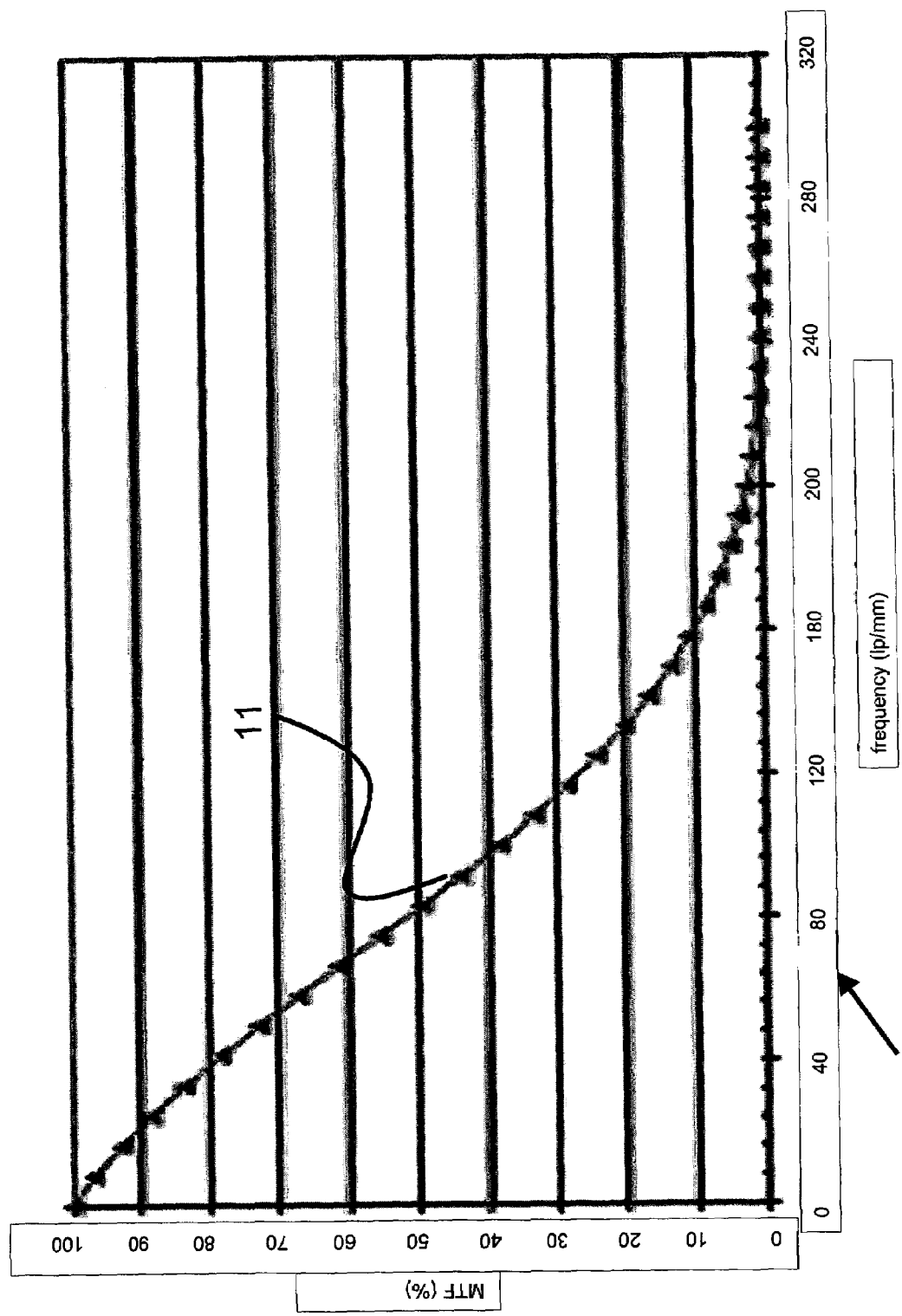
FIG. 4 shows an exemplary illustration for the modulation transmission function of an optical lowpass filter according to the invention.

FIG. 4 shows an exemplary illustration of the modulation transmission function (MTF) 10, which reproduces the absolute magnitude of the optical transmission function (OTF), and thus the contrast. The x-axis reproduces the spatial frequency in line pairs per mm, while the y-axis reproduces the relative transmission in %. As is desired in order to improve the image quality in the case of an optical lowpass filter, the curve 11 firstly shows a relatively flat and then a steep drop in contrast. High spatial frequency components that are above the maximum resolution of a digital image sensor and lead to defective information of the sensor are thus reduced.

Figure 5:
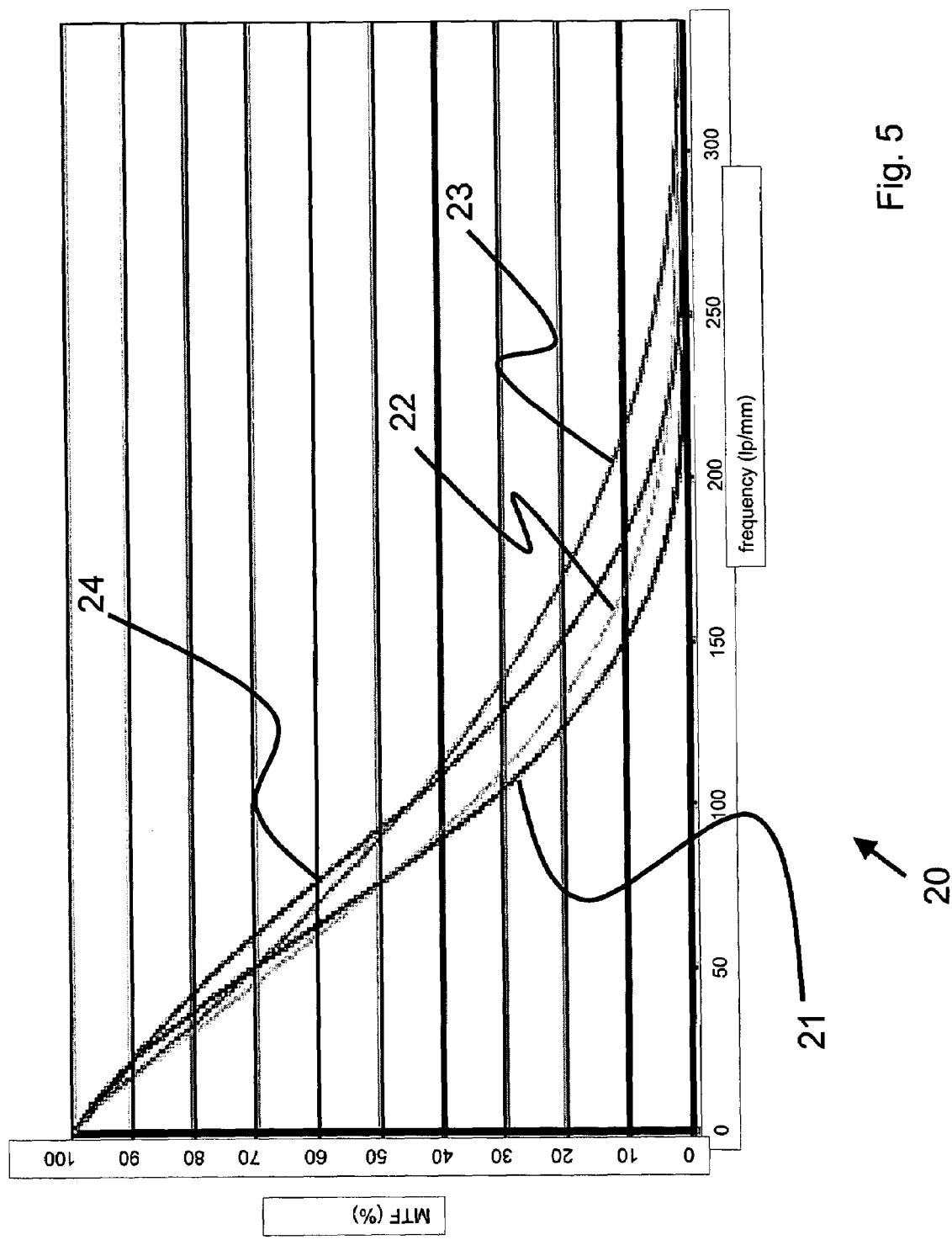
FIG. 5 shows illustrations, compared by way of example, of the modulation transmission function of various exemplary embodiments of optical lowpass filters according to the invention.

Like FIG. 4, FIG. 5 shows curves 21, 22, 23, 24 that reproduce the MTF, but for various exemplary embodiments. The lowpass filter according to the invention can be tuned to the respective optical sensor via the materials used and the geometry of fibers and covering material. For example, by comparison with curve 21, the contrast for curve 24 does not drop until at a substantially higher spatial resolution. The optical lowpass filter having a characteristic in accordance with curve 24 would therefore be better suited to more highly resolving image sensors.

The invention claimed is:

1. An optical lowpass filter comprising a plurality of light guiding optical fibers wherein the plurality of light guiding optical fibers have a diameter that is below 10 μm.

2. The optical lowpass filter as claimed in claim 1, wherein the plurality of light guiding optical fibers are arranged substantially parallel to one another.

3. The optical lowpass filter as claimed in claim 1, wherein the plurality of light guiding optical fibers are embedded in a covering material.

4. The optical lowpass filter as claimed in claim 1, wherein the plurality of light guiding optical fibers have a cross sectional shape selected from the group consisting of round, elliptical, rectangular, square, and hexagonal.

5. The optical lowpass filter as claimed in claim 4, wherein the cross sectional shape is arranged relative to one another in honeycomb fashion.

6. The optical lowpass filter as claimed in claim 3, wherein the plurality of light guiding optical fibers and the covering material have a different refractive index.

7. The optical lowpass filter as claimed in claim 1, wherein the plurality of light guiding optical fibers are glass fibers.

8. The optical lowpass filter as claimed in claim 3, wherein the covering material is glass.

9. The optical lowpass filter as claimed in claim 3, wherein the covering material and/or at least a portion of the plurality of light guiding optical fibers are/is dyed in a substantially dark fashion.

10. The optical lowpass filter as claimed in claim 1, further comprising a plurality of light absorbing fibers.

11. The optical lowpass filter as claimed in claim 10, wherein the plurality of light absorbing fibers are arranged regularly.

12. The optical lowpass filter as claimed in claim 10, wherein the plurality of light absorbing fibers are arranged irregularly.

13. The optical iowpass filter as claimed in claim 1, wherein the plurality of light guiding optical fibers each comprises an acceptance surface and an exit surface having a shape selected from the group consisting of a piano-concave shape, a piano-convex shape, a biconcave shape, a biconvex shape, a convex-concave shape, and a concave-convex shape.

14. The optical lowpass filter as claimed in claim 1, wherein the plurality of light guiding optical fibers have a respectively different refractive index from one another.

15. The optical lowpass filter as claimed in claim 1, wherein the plurality of light guiding optical fibers are arranged substantially without order relative to one another.

16. The optical lowpass filter as claimed in claim 1, wherein the plurality of light guiding optical fibers have at least two different diameters.

17. The optical lowpass filter as claimed in claim 1, further comprising an antiscratch coating on at least one side.

18. The optical lowpass filter as claimed in claim 1, further comprising an antireflection coating on at least one side.

19. The optical lowpass filter as claimed in claim 1, further comprising a numerical aperture that changes from a center toward an edge.

20. The optical lowpass filter as claimed in claim 1, wherein the plurality of light guiding optical fibers each have an acceptance surface and/or an exit surface that has a convex or concave shape.

21. An image sensor, comprising an optical lowpass filter having a plurality of light guiding optical fibers, wherein the plurality of light guiding optical fibers have a diameter that is below 10 μm.

22. The image sensor as claimed in claim 21, further comprising pixels having a predetermined pixel size wherein the plurality of light guiding optical fibers have a diameter that is smaller than the predetermined pixel size.

23. The image sensor as claimed in claim 22, wherein the plurality of light guiding optical fibers are arranged substantially in accordance with the pixels.

24. The image sensor as claimed in claim 23, wherein the plurality of light guiding optical fibers are aligned in a fashion essentially congruent with the pixels.

25. The image sensor as claimed in claim 23, wherein the plurality of light guiding optical fibers have a diameter that corresponds approximately to the predetermined pixel size.

26. The image sensor as claimed in claim 21, further comprising a numerical aperture that is appropriately matched to an optical characteristic of the image sensor.

27. The image sensor as claimed in claim 21, wherein the image sensor is useful as a device selected from the group consisting of an imaging element, a liquid crystal on silicon, a digital micromirror device, a digital projector, an optical lens, an attachment for a camera, a digital camera, a mirror reflex camera, and a mobile phone camera.

28. An optical lowpass filter comprising a plurality of light guiding optical fibers wherein the optical lowpass filter is substantially free from potassium-40.

29. An optical lowpass filter comprising a plurality of light guiding optical fibers further comprising a layer and/or material that absorbs infrared radiation.

30. An optical lowpass filter comprising a plurality of light guiding optical fibers further comprising a numerical aperture of above 0.6.

31. An optical lowpass filter comprising a plurality of light guiding optical fibers wherein the optical lowpass filter has a thickness of below 2 mm.

32. An optical lowpass filter comprising a plurality of light guiding optical fibers wherein the plurality of light guiding optical fibers are embedded in a covering material and wherein the covering material has a thickness below 5μm.

33. An optical lowpass filter comprising a plurality of light guiding optical fibers further comprising an ultrasound transmitter.

* * * * *